(12) United States Patent
Bourgeois

(10) Patent No.: US 9,744,812 B2
(45) Date of Patent: Aug. 29, 2017

(54) TIRE ASSEMBLY HAVING AN IMPROVED BEAD AND A MOUNTING RIM

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Frederic Bourgeois, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 338 days.

(21) Appl. No.: 14/381,325

(22) PCT Filed: Feb. 21, 2013

(86) PCT No.: PCT/EP2013/053405
§ 371 (c)(1),
(2) Date: Aug. 27, 2014

(87) PCT Pub. No.: WO2013/127680
PCT Pub. Date: Sep. 6, 2013

(65) Prior Publication Data
US 2015/0020945 A1    Jan. 22, 2015

(30) Foreign Application Priority Data
Feb. 28, 2012 (FR) .................................... 12 51787

(51) Int. Cl.
*B60C 15/00* (2006.01)
*B60C 15/06* (2006.01)
(Continued)

(52) U.S. Cl.
CPC ............ *B60C 13/00* (2013.01); *B60C 9/0007* (2013.04); *B60C 9/02* (2013.01); *B60C 9/28* (2013.01);
(Continued)

(58) Field of Classification Search
CPC ..... B60C 15/00; B60C 15/0009; B60C 15/06; B60C 15/0603; B60C 15/0607;
(Continued)

(56) References Cited

U.S. PATENT DOCUMENTS

2012/0325390 A1    12/2012 Bourgeois

FOREIGN PATENT DOCUMENTS

WO    2011/067211    6/2011

OTHER PUBLICATIONS

International Search Report for PCT/EP2013/053237 dated Jul. 12, 2013.

*Primary Examiner* — Justin Fischer
(74) *Attorney, Agent, or Firm* — Dickinson Wright PLLC

(57) ABSTRACT

Assembly comprising a tire and a mounting rim, the tire comprising two beads each comprising at least one annular reinforcing structure and a carcass reinforcement anchored in the two beads by a turn-up, each bead comprising a filler of a rubber composition extending radially a radial distance DBE from the radially innermost point of the annular reinforcing structure, DBE being less than or equal to 10% of the radial height H of the tire, at least one sidewall further comprising a stiffening reinforcement of metallic reinforcing elements oriented at an angle less than or equal to 10 degrees to the circumferential direction, and positioned such that the distance DAE between the radially innermost point of the annular reinforcing structure and the radially outer end of the stiffening reinforcement is greater than or equal to 20% and less than or equal to 40% of H and that the (Continued)

distance DAI between the radially inner point of the annular reinforcing structure and the radially inner end of the stiffening reinforcement is less than or equal to 20% of H.

13 Claims, 7 Drawing Sheets

(51) Int. Cl.
  *B60C 13/00* (2006.01)
  *B60C 9/28* (2006.01)
  *B60C 9/00* (2006.01)
  *B60C 9/02* (2006.01)
(52) U.S. Cl.
  CPC .......... *B60C 15/06* (2013.01); *B60C 15/0603* (2013.04); *B60C 15/0628* (2013.04); *B60C 2015/061* (2013.04); *B60C 2015/0639* (2013.04); *B60C 2015/0657* (2013.04); *B60C 2015/0685* (2013.04)
(58) Field of Classification Search
  CPC ............ B60C 15/0628; B60C 15/0632; B60C 15/0635; B60C 15/0653
  See application file for complete search history.

TIRE ASSEMBLY HAVING AN IMPROVED BEAD AND A MOUNTING RIM

This application is a 371 national phase entry of PCT/EP2013/053405, filed 21 Feb. 2013, which claims benefit of FR 1251787, filed 28 Feb. 2012, the entire contents of which are incorporated herein by reference for all purposes.

BACKGROUND

Field

The present disclosure relates to tires for passenger vehicles, and notably the beads of these tires.

Description of Related Art

Reducing the emissions of greenhouse gases in the field of transport is one of the major challenges facing vehicle manufacturers today. A great deal of progress has been made through tires, by lowering the rolling resistance, because this has a direct impact on vehicle fuel consumption. Notable progress has been achieved and the great success of the Energy™ Saver tire recently marketed by Michelin for example bears witness to this. The technology employed allows around 0.2 l of fuel to be saved per 100 km in mixed cycle, representing a reduction of almost 4 g of $CO_2$ per km. Over the life of a vehicle, that corresponds to approximately one tonne of $CO_2$ that is not released into the atmosphere.

Bearing in mind the predictable increase in the price of crude oil and the ever increasing ecological awareness of consumers, it is nonetheless necessary to continue the battle to reduce the rolling resistance of tires.

The assembly formed by the bead and the radially inner part of the sidewall of a tire is one of the tire components of which the structure has a very marked impact on the rolling resistance of the tire. It has numerous roles: it absorbs the tension in the carcass reinforcement and transmits the loads applied to the tire from the sidewall to the rim. It therefore, from the rim, guides the crown of the tire. Its influence on the roadholding of the tire is considerable, especially when the tire is highly loaded. All of these functions are usually performed by the combination of a reinforcement (comprising the bead wire and the turn-up of the carcass reinforcement about this bead wire) and of a "filler" made of rubber composition. The compromise between the stiffness to be achieved, particularly for guiding the crown, and the expected endurance generally means that a certain path of the carcass reinforcement is planned and use is made of a filler that is bulky (tall and/or thick) and rigid. The downside of this geometry is significant hysteresis losses, particular in the filler. The stiffening action of the filler is applied especially in the region remote from the bead and therefore entails a filler that is even bulkier and, therefore, even greater hysteresis losses.

While searching for a very low rolling resistance tire for passenger vehicles, the applicant company has proposed a tire in which the volume of the filler has been reduced as far as possible and in which the stiffening function is provided by a reinforcement that has very low hysteresis. Such as tire is disclosed in document WO 2011/067211.

That tire, although it allows an excellent compromise between rolling resistance and cornering stiffness, has not lived up to expectations in terms of endurance.

SUMMARY

One of the objectives of embodiments of the present invention is to provide a tire for passenger vehicles that has very low rolling resistance combined with good endurance.

This objective is achieved, at least in part, by reducing as far as possible the compression introduced into the metallic reinforcing elements and the shear experienced by the rubber composition positioned near these reinforcing elements.

More specifically, in an embodiment, this objective is achieved by an assembly comprising a tire and a suitable mounting rim, the tire comprising:

two beads intended to come into contact with the mounting rim, each bead comprising at least one annular reinforcing structure, each annular reinforcing structure having an axially innermost point, the two annular reinforcing structures defining a median plane of the tire, perpendicular to the axis of rotation of the tire and situated equal distances from the annular reinforcing structures of each bead;

two sidewalls extending the beads radially outwards, the two sidewalls meeting in a crown comprising a crown reinforcement comprising two plies each comprising reinforcing elements and being in contact with one another over at least part of the width of the crown, this part extending on each side of the median plane of the tire, between two contact ends, the crown reinforcement being surmounted by a tread;

at least one carcass reinforcement extending from the beads through the sidewalls as far as the crown, the carcass reinforcement comprising a plurality of carcass reinforcing elements and being anchored in the two beads by a turn-up around the annular reinforcing structure so as to form, within each bead, a main strand and a turn-up, each turn-up extending radially outwards as far as an end situated a radial distance DRE from the radially innermost point of the annular reinforcing structure of the bead, the radial distance DRE being greater than or equal to 5% and less than or equal to 20% of the radial height H of the tire.

Each bead comprises a filler formed of a rubber composition, the filler being situated, at least partially, radially on the outside of the annular reinforcing structure and at least partially between the main strand and the turn-up of the carcass reinforcement, the filler extending radially as far as a radial distance DBE from the radially innermost point of the annular reinforcing structure of the bead, the radial distance DBE being less than or equal to 10% of the radial height H of the tire.

At least one sidewall of the tire further comprises a stiffening reinforcement having a radially inner end and a radially outer end, the stiffening reinforcement being formed of a plurality of metallic reinforcing elements oriented at an angle less than or equal to 10 degrees with respect to the circumferential direction, this stiffening reinforcement being positioned in such a way that the distance DAE between the radially innermost point of the annular reinforcing structure and the radially outer end of the stiffening reinforcement is greater than or equal to 20% and less than or equal to 40% of the radial height H of the tire and that the distance DAI between the radially innermost point of the annular reinforcing structure and the radially inner end of the stiffening reinforcement is greater than or equal to 5% and less than or equal to 15% of the radial height H of the tire.

A portion of rubber composition is positioned axially on the outside of the stiffening reinforcement, the thickness E2 of this portion of rubber composition, measured perpendicular to the stiffening reinforcement, is greater than or equal to 1.2 mm at all points.

In the tire of an assembly according to an embodiment of the invention, the ratio D2/D1 is greater than or equal to 1, where D1 denotes the axial distance between each contact end and the median plane of the tire and D2 is the axial distance between the axially innermost point of the annular reinforcing structure and the median plane of the tire, the distances D1 and D2 being measured when the tire is mounted on the mounting rim and inflated to a service pressure. The "contact ends" are determined as follows. Starting on the median plane of the tire, the crown reinforcement is followed in a direction away from this plane, on each side of the median plane. The contact ends are those points on the crown reinforcement at which the radial distance between the two plies of the crown reinforcement reaches or exceeds for the first time 1.30×EC, where EC denotes the distance between the two plies in the median plane. It should be emphasized that the distances between plies are measured between the centers of the reinforcing elements of these plies.

The tire further comprises an uncoupling or decoupling ply made of a rubber composition and positioned axially between the carcass reinforcement and the stiffening reinforcement, the decoupling ply having a radially inner end and a radially outer end, the decoupling ply having a thickness E1 greater than or equal to 0.8 mm, this thickness being measured perpendicular to the stiffening reinforcement.

The radially inner end of the stiffening reinforcement is radially on the outside of the radially inner end of the decoupling ply, the radial distance DB between these two ends being less than 10 mm (and preferably less than or equal to 8 mm), and the radially outer end of the stiffening reinforcement is radially on the inside of the radially outer end of the decoupling ply, the radial distance DC between these two ends being less than 10 mm (and preferably less than or equal to 8 mm).

It should be emphasized that the choice of a mounting rim suitable for a tire is an operation within the competence of a person skilled in the art who in general will follow the recommendations of standardising organisations such as the ETRTO (European Tire and Rim Technical Organisation).

The drop in rolling resistance is essentially due to the reduction in the volume of the filler. What happens is that the filler is traditionally formed of a rubber composition of high hysteresis. When the filler is deformed, it therefore dissipates a great deal of energy. Reducing the volume of the filler would reduce the cornering stiffness of the tire. In the tire of an assembly according to the invention, the cornering stiffness is carefully maintained through the presence of the metallic stiffening reinforcement and the improvement in endurance is obtained through the use of the decoupling ply.

According to one advantageous embodiment, the ratio D2'/D1 is greater than or equal to 0.9 (and preferably greater than or equal to 0.95) and less than or equal to 0.97, where D2' denotes the axial distance between the axially innermost point of the annular reinforcing structure and the median plane of the tire, measured when the tire is in the free state, not mounted on a rim and not inflated, and placed on the ground in such a way that its axis of rotation is parallel to the ground.

According to one advantageous embodiment, the filler has an axial thickness E(r), this axial thickness corresponding to the length of the intersection of the filler with a straight line parallel to the axis of rotation of the tire and having an intersection with the filler at a radial distance r from the radially innermost point of the annular reinforcing structure, the trend of the axial thickness E(r) being such that, in the range of distances r comprised between 0% and 10% of the radial height H of the tire, the variation in axial thickness $$\frac{\partial E(r)}{\partial r}$$

is less than or equal to −0.5 mm/mm over at least 3% of the radial height H of the tire.

Good results have also been obtained with a tire in which the filler has an axial thickness E(r), this axial thickness corresponding to the length of the intersection of the filler with a straight line parallel to the axis of rotation of the tire and having an intersection with the filler at a radial distance r from the radially innermost point of the annular reinforcing structure, the trend of the axial thickness E(r) being such that, in the range of distances r comprised between 0% and 10% of the radial height H of the tire, the variation in axial thickness $$\frac{\partial E(r)}{\partial r}$$

is less than or equal to 1 mm/mm over at least 1.5% of the radial height H of the tire.

As stated in document WO 2011/067211, the reduction in the rolling resistance is particularly great when the stiffening reinforcement is "split", namely made up of a plurality of discontinuous reinforcing elements, these reinforcing elements being positioned in a plurality of circles concentric with the axis of rotation of the tire. This effect is not yet fully understood; it would appear to be connected with the controlled reduction in the extension stiffnesses of the stiffening reinforcement which is rendered possible by the splitting up.

Excellent results are obtained when the stiffening reinforcement is split up in the way adopted in certain additional reinforcements for construction plant tires with a view to improving the endurance thereof, as taught in document U.S. Pat. No. 6,935,394 B2 (also published as WO 03/103990 A1). In a tire according to this advantageous embodiment, the stiffening reinforcement is made up of a plurality of discontinuous reinforcing elements of length L0, these reinforcing elements being positioned in a plurality of circles (C, C1, C2) concentric with the axis of rotation of the tire mounted on its rim, each circle being defined by a mean radius (R, R1, R2) measured with respect to the said axis of rotation, each discontinuous reinforcing element of length L0 situated on a circle C of radius R being mechanically coupled over coupling lengths L11 and L12 respectively to two discontinuous reinforcing elements situated on a circle C1 of radius R1 less than the radius R, the said circle being immediately adjacent to the circle C, in which the coupling lengths L11 and L12, L11 being taken as being greater than or equal to L12, satisfy the following relationship: $1.5 \leq K \leq 4$ with $K=(1-L12/L0)/(1-L11/L0)$.

By adhering to this relationship for all the discontinuous reinforcers of all the circles, an optimum distribution of the ends of the discontinuous reinforcing elements is obtained.

This optimum distribution can be achieved by placing the stiffening reinforcement on the green tire built in the shape of a torus or alternatively on a tire-building drum before the said stiffening reinforcement is shaped.

This relationship applies irrespective of whether or not the length L0 is the same for all the cords.

More preferably still, K is such that $2 \leq K \leq 2.5$.

Of course, when it is stated that the reinforcing elements are positioned on concentric circles, this should be understood as meaning that these reinforcing elements may be placed on turns and that each reinforcing element is positioned on a curve that can be likened to an arc of a circle.

According to one particularly advantageous embodiment, each discontinuous reinforcing element of length L0 situated on a circle C of radius R is mechanically coupled over coupling lengths L11 and L12 to two discontinuous reinforcing elements situated on a circle C1 of radius R1, which circle is immediately adjacent to the circle C, the coupling length L11 being greater than or equal to 55% of L0 and less than or equal to 75% of L0 and the coupling length L12 being greater than or equal to 10% of L0 and less than or equal to 30% of L0; and each discontinuous reinforcing element of length L0 situated on a circle C of radius R is mechanically coupled over coupling lengths L21 and L22 to two discontinuous reinforcing elements situated on a circle C2 of radius R2, which circle is immediately adjacent to the circle C1, the coupling length L21 being greater than or equal to 20% of L0 and less than or equal to 40% of L0 and the coupling length L22 being greater than or equal to 45% of L0 and less than or equal to 65% of L0.

Excellent results are obtained when the mounting rim comprises a part forming a rim seat comprising, radially on the outside, a rim flange of substantially circular profile, and when the radially outer end of the stiffening reinforcement is situated on a straight line J2 passing through the center J of the profile of the rim flange and making an angle α (alpha) open axially towards the inside and radially towards the outside, the angle α (alpha) being greater than or equal to 90° and less than or equal to 120°, and preferably greater than or equal to 100° and less than or equal to 115°.

Of course, it is possible and even desirable to combine two or more of the embodiments described.

DETAILED DESCRIPTION OF SPECIFIC EMBODIMENTS

Figure 1:
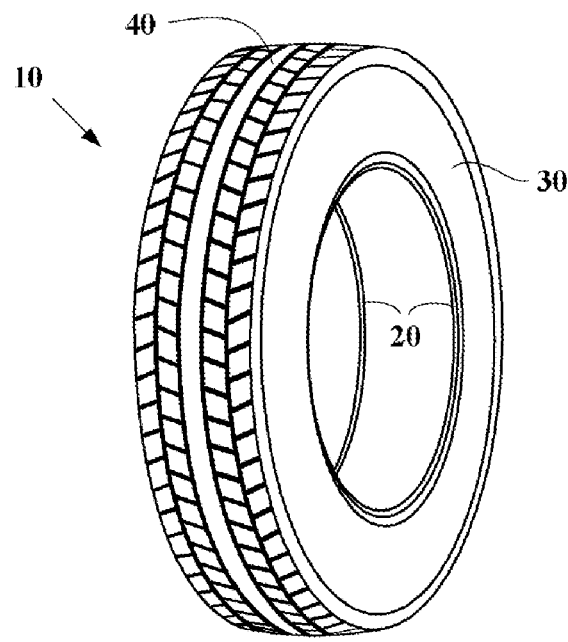
FIG. 1 depicts a tire according to the prior art.

When using the term "radial" it is appropriate to make a distinction between the various different uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is this sense of the term that applies also when matters of radial distance are being discussed.

By contrast, a thread or reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, cords, folded yarns or equivalent assemblies, irrespective of the material of which the thread is made or of the surface treatment it has received in order to encourage it to bond with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further from the median plane of the tire than is the point P8. The "median plane" of the tire is the plane which is perpendicular to the axis of rotation of the tire and which lies equal distances from the annular reinforcing structures of each bead.

A "circumferential" direction is a direction which is perpendicular both to a radius of the tire and to the axial direction. A "circumferential cross section" is a cross section on a plane perpendicular to the axis of rotation of the tire.

A "tread surface" here means all of those points of the tread of a tire that can come into contact with the ground when the tire is being driven on.

The expression "rubber composition" denotes a rubber composition containing at least an elastomer and a filler.

The "elastic modulus" of a rubber composition means the secant modulus of extension obtained under tension in accordance with standard ASTM D 412 of 1998 (test specimen "C"): the apparent secant moduli at 10% strain, denoted "MA10" and expressed in MPa (under standard temperature and relative humidity conditions in accordance with standard ASTM D 1349 of 1999) are measured in second elongation (namely after an accommodation cycle). A distinction should be made between this elastic modulus and the elastic moduli obtained under compression, the values of which are generally very much different from the moduli obtained under tension.

In order to make the description of the variants shown in the figures easier to understand, the same references are used to denote elements of identical structure.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards, and two beads 20 radially on the inside of the sidewalls 30.

Figure 2:
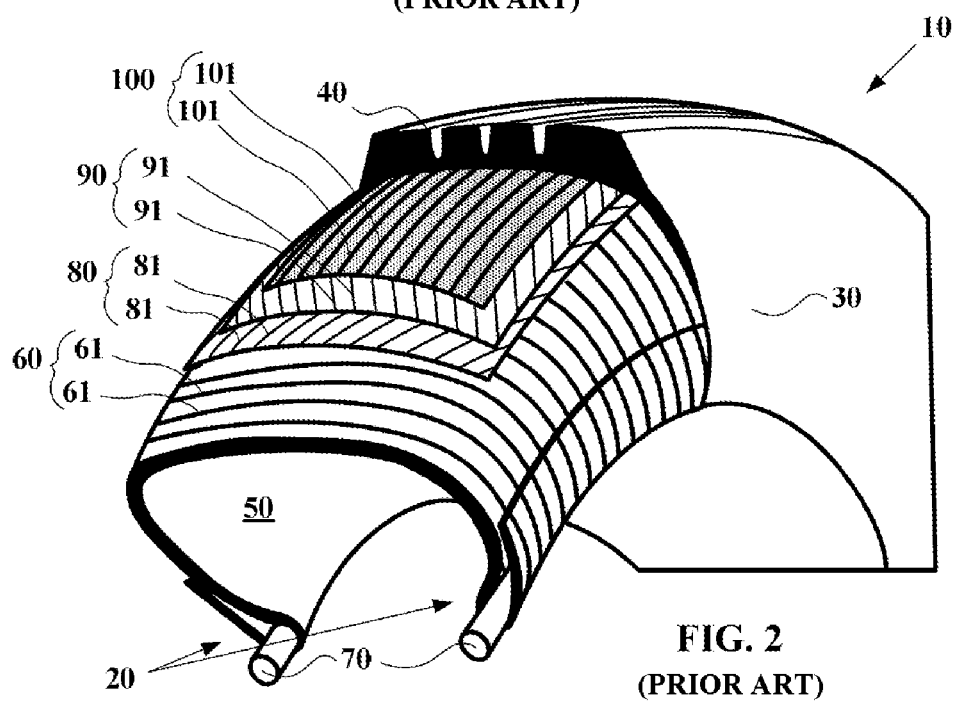
FIG. 2 depicts a partial perspective view of a tire according to the prior art.

FIG. 2 schematically depicts a partial perspective view of a tire 10 according to the prior art and illustrates the various components of the tire. The tire 10 comprises a carcass reinforcement 60 made up of threads 61 coated with rubber composition, and two beads 20 each comprising annular reinforcing structures 70 which hold the tire 10 on the rim (the rim is not depicted). The carcass reinforcement 60 is anchored in each of the beads 20 by a turn-up around the annular reinforcing structures 70. The tire 10 further comprises a crown reinforcement comprising two plies 80 and 90. Each of the plies 80 and 90 is reinforced by filamentary reinforcing elements 81 and 91 which are parallel within each layer and crossed from one layer to the other, making angles comprised between 10° and 70° with the circumferential direction. The tire further comprises a hoop reinforcement 100, positioned radially on the outside of the crown reinforcement, this hoop reinforcement being formed of reinforcing elements 101 oriented circumferentially and wound in a spiral. A tread 40 is placed on the hoop reinforcement; it is this tread 40 which provides contact between the tire 10 and the road. The tire 10 depicted is a "tubeless" tire: it comprises an "inner liner" 50 made of a rubber composition impervious to the inflation gas, covering the interior surface of the tire.

Figure 3:
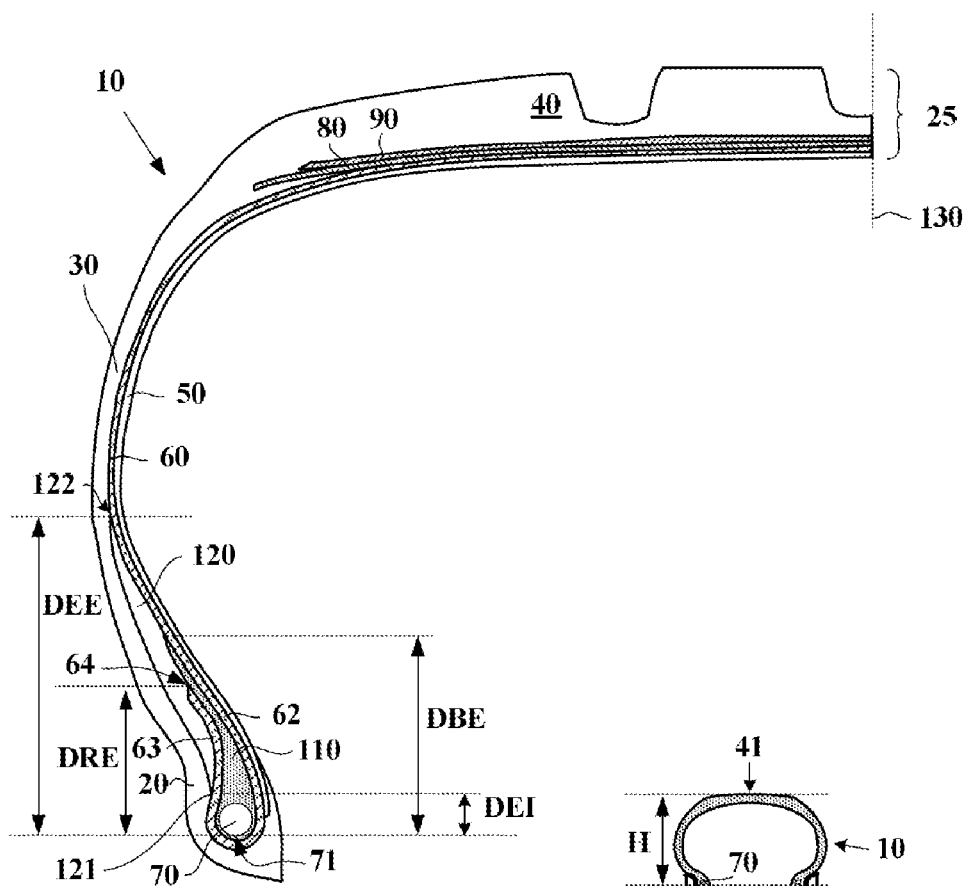
FIG. 3 depicts, in radial section, one quarter of a tire according to the prior art.

FIG. 3 schematically depicts, in radial section, one quarter of a reference tire 10 of the Energy™ Saver type marketed by Michelin. The tire 10 comprises two beads 20 intended to come into contact with a mounting rim (not depicted), each bead 20 comprising a bead wire 70. Two sidewalls 30 extend the beads 20 radially outwards and meet in a crown 25 comprising a crown reinforcement formed of a first layer of reinforcing elements 80 and of a second layer of reinforcing elements 90 and surmounted radially by a tread 40. Each layer comprises filamentary reinforcing elements coated in a matrix made of rubber composition. The reinforcing elements of each layer are substantially parallel to one another; the reinforcing elements of the two layers are crossed from one layer to the other at an angle of around 20°, as is well known to those skilled in the art for tires referred to as radial tires. The median plane of the tire bears the reference 130.

The tire 10 further comprises a carcass reinforcement 60 which extends from the beads 20 through the sidewalls 30 as far as the crown 25. This carcass reinforcement 60 in this instance comprises filamentary reinforcing elements oriented substantially radially, namely making with the circumferential direction an angle greater than or equal to 80° and less than or equal to 90°.

The carcass reinforcement 60 comprises a plurality of carcass reinforcing elements and is anchored in the two beads 20 by a turn-up around the bead wire 70 so as to form, within each bead, a main strand 62 and a turn-up 63. The turn-up extends radially outwards as far as an end 64 situated a radial distance DRE away from the radially innermost point 71 of the annular reinforcing structure of the bead, the radial distance DRE here being equal to 19% of the radial height H of the tire.

Figure 4:
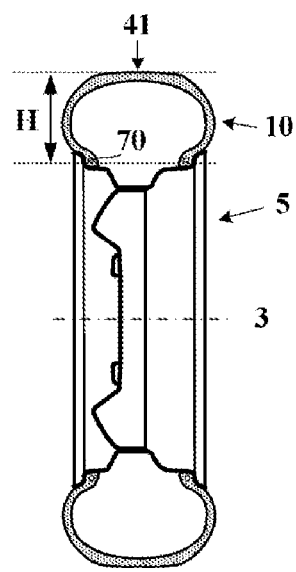
FIG. 4 illustrates how the height H of a tire is determined.

The "radial height" H of a tire is defined as being the radial distance between the radially innermost point 71 of the annular reinforcing structure 70 of the bead 20 and the radically outermost point 41 (FIG. 4) of the tread 40 when the tire 10 is mounted on a mounting rim 5 (as depicted in FIG. 4) and inflated to its service pressure.

Each bead comprises a filler 110, the filler being situated for the most part radially on the outside of the bead wire 70 and between the main strand 62 and the turn-up 63 of the carcass reinforcement 60. In this instance the rubber composition used has an elastic modulus of 56 MPa.

Each bead further comprises an outer layer or strip 120 positioned axially on the outside of the carcass reinforcement and of the filler. The outer strip 120 extends radially on the outside of a radially inner end 121 situated a distance DEI from the radially innermost point 71 of the bead wire 70 as far as a radially outer end 122 situated a distance DEE from the radially innermost point 71 of the bead wire 70. In this particular instance, the distance DEI is equal to 6.5% and the distance DEE is equal to 41.5% of the radial height H of the tire.

Figure 5:
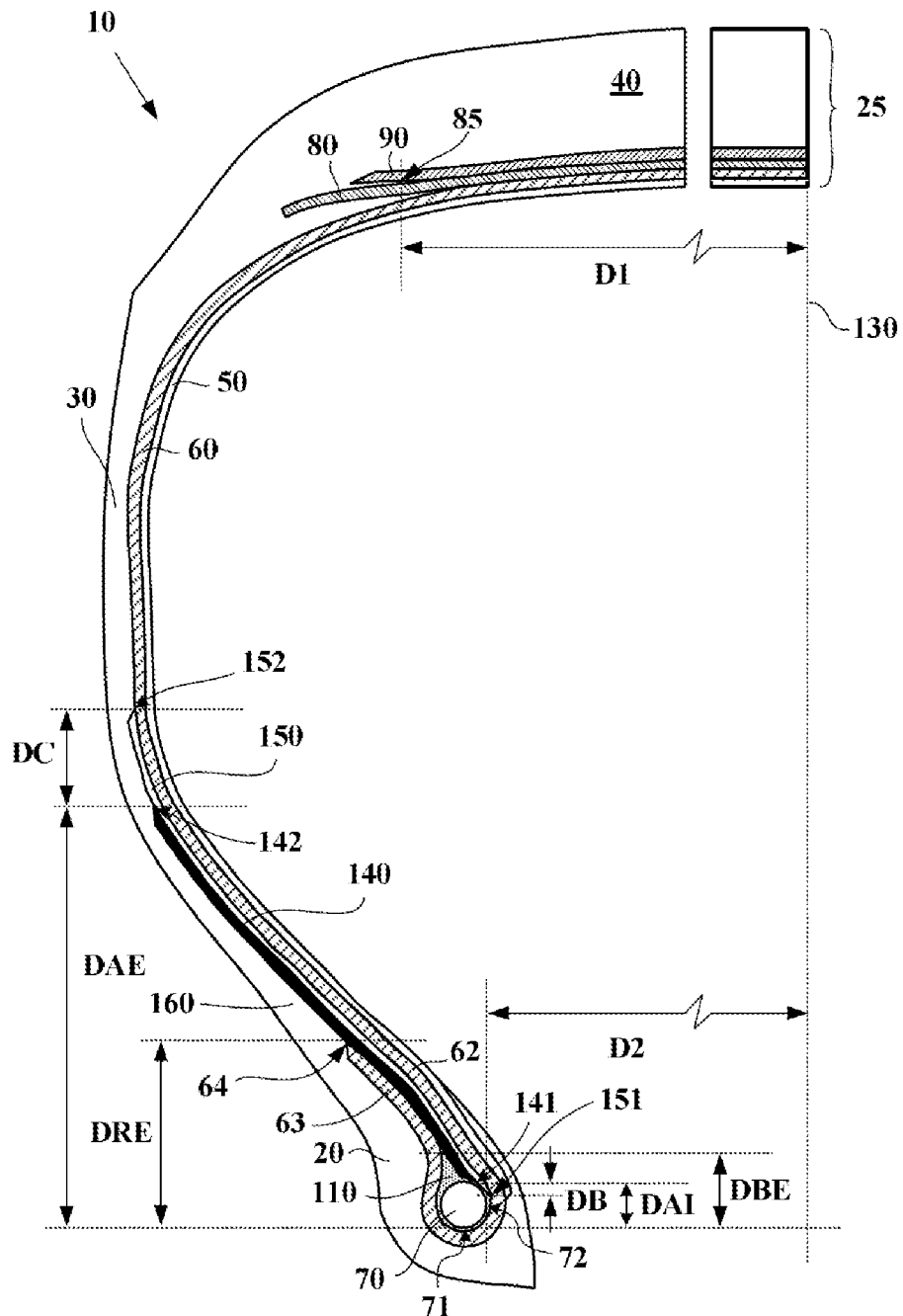
FIG. 5 depicts, in radial section, part of a tire according to the prior art.

FIG. 5 depicts, in radial section, part of a tire 10 disclosed in document WO 2011/067211 and comprising two beads 20 (just one of which has been depicted) intended to come into contact with a mounting rim (not depicted), each bead comprising a bead wire 70. The bead wire 70 has a radially innermost point 71 and an axially innermost point 72. The two annular reinforcing structures 70 (just one of which has been depicted) define a median plane 130 of the tire, perpendicular to the axis of rotation (not depicted) of the tire and situated equal distances from the annular reinforcing structures 70 of each bead. Two sidewalls 30 (just one of which has been depicted) extend the beads 20 radially outwards. The two sidewalls 30 meet in a crown 25 comprising a crown reinforcement formed by two plies 80 and 90, surmounted by a tread 40. The two plies 80 and 90 are contact with one another over a substantial proportion of the width of the tire, on each side of the median plane 130, between two contact ends of which just one, bearing the reference 85, has been depicted.

A carcass reinforcement 60 extends from the beads 20 through the sidewalls 30 as far as the crown 25. The carcass reinforcement 60 comprises a plurality of carcass reinforcing elements; it is anchored in the two beads 20 by being turned up around the bead wire 70 so as to form, within each bead, a main strand 62 and a turn-up 63. The turn-up 63 extends radially on the outside as far as an end 64 situated a radial distance DRE from the radially innermost point 71 of the bead wire 70. The radial distance DRE is equal here to 16% of the radial height H of the tire.

The bead 20 comprises a filler 110 formed of a rubber composition having an elastic modulus greater than or equal to 40 MPa and less than or equal to 60 MPa.

Table I gives, by way of example, the composition of a rubber composition that can be used as filler. The composition is given in phr ("per hundred rubber"), i.e. in parts by weight per 100 parts by weight of rubber. The corresponding elastic modulus MA10 is also indicated.

TABLE I

|  | Parts in phr |
| --- | --- |
| NR [1] | 100 |
| N 330 [2] | 75 |
| formophenol resin | 18 |
| antioxidant (6PPD) [3] | 1 |
| cobalt naphthenate | 6 |
| stearic acid | 0.5 |
| ZnO | 9 |
| HMT3H [4] | 2 |
| sulphur | 9 |
| accelerator (TBBS) [5] | 1 |
| MA10 | 52 ± 2 |

Notes on Table I:
[1] natural rubber
[2] carbon black series 330 (ASTM)
[3] N-(1,3-dimethylbutyl)-N'-phenyl-p-phenylenediamine
[4] hexamethylenetetramine
[5] N-tert-butyl-2-benzothiazyl sulphenamide The filler is preferably based on at least a diene elastomer, a reinforcing filler and a crosslinking system.

A "diene" elastomer (or interchangeably rubber) means, in the known way, an elastomer derived at least in part (i.e. a homopolymer or a copolymer) from diene monomers, namely monomers bearing two conjugated or unconjugated carbon-carbon double bonds. The diene elastomer used is preferably selected from the group consisting of polybutadienes (BR), natural rubber (NR), synthetic polyisoprenes (IR), butadiene-styrene (SBR) copolymers, isoprene-butadiene (BIR) copolymers, isoprene-styrene (SIR) copolymers, butadiene-styrene-isoprene (SBIR) copolymers and blends of these elastomers.

One preferred embodiment is to use an "isoprene" elastomer, namely a homopolymer or copolymer of isoprene, or in other words a diene elastomer selected from the group consisting of natural rubber (NR), synthetic polyisoprenes (IR), various copolymers of isoprene and blends of such elastomers.

The isoprene elastomer is preferably natural rubber or a synthetic polyisoprene of cis-1,4 type. Of these synthetic polyisoprenes, use is preferably made of polyisoprenes that have a level (mol %) of cis-1,4 bonds higher than 90%, more preferably still higher than 98%. According to other preferred embodiments, the diene elastomer may consist, completely or partially, of another diene elastomer such as, for example, an SBR (E-SBR or S-SBR) elastomer which may or may not be cut with another elastomer, for example of the BR type.

The rubber composition may also contain all or some of the additives habitually used in the rubber matrices intended for the manufacture of tires, such as, for example, reinforcing fillers such as carbon black or inorganic fillers such as silica, coupling agents for inorganic fillers, antiageing agents, antioxidants, plasticizers or extension oils, whether or not the latter are of aromatic or non-aromatic nature (notably oils that are very weakly if at all aromatic, for example of the naphthene or paraffin oil type, of high or preferably low viscosity, MES or TDAE oils, plasticizing resins with a high Tg higher than 30° C.), processability agents, compositions in the raw state, tackifying resins, a cross-linking system based either on sulphur or on sulphur donors and/or peroxide, accelerants, vulcanization activators or retardants, antireversion agents, acceptors and donors of methylene such as, for example, HMT (hexamethylenetetramine) or H3M (hexamethoxymethylmelamine), reinforcing resins (such as resorcinol or bismaleimide), known adhesion promotion systems of the metal salt type for example, notably salts of cobalt or of nickel.

The compositions are manufactured in appropriate mills, using two successive preparation phases well known to those skilled in the art: a first phase of thermomechanical mixing or work (phase referred to as "non-productive") at high temperature, up to a maximum temperature comprised between 110° C. and 190° C., preferably between 130° C. and 180° C., followed by a second phase of mechanical work (phase referred to as "productive") up to a lower temperature, typically below 110° C., this being a finishing phase during which the crosslinking system is incorporated.

By way of example, the non-productive phase is conducted in a single thermomechanical step lasting a few minutes (for example between 2 and 10 min) during which all the basic ingredients necessary and other additives, with the exception of the crosslinking or vulcanizing system, are introduced into a suitable mill such as a conventional internal mixer. After the mixture thus obtained has cooled, the vulcanizing system is then incorporated in an external mixer such as an open mill, kept at a low temperature (for example between 30° C. and 100° C.). The assembly is then mixed (productive phase) for a few minutes (for example between 5 and 15 min).

The final composition thus obtained is then calendered, for example into the form of a sheet or plate, for characterization, or is alternatively extruded, to form the layer or layers of rubber composition of very high modulus used in the tire of an assembly according to the invention.

Vulcanizing (or curing) can then take place in the known way at a temperature generally of between 130° C. and 200° C., preferably under pressure, for a sufficient length of time which may vary for example between 5 and 90 min and is notably dependent on the curing temperature, on the vulcanizing system adopted and on the vulcanization dynamics of the composition concerned.

For the most part the filler 110 is situated radially on the outside of the bead wire, between the main strand 62 and the turn-up 63 of the carcass reinforcement 60. It extends radially as far as a radial distance DBE from the radially innermost point 71 of the bead wire 70. The radial distance DBE in this instance is equal to 8% of the radial height H of the tire 10. This small radial height of the filler contributes to the low rolling resistance of the tire. A filler of near residual volume may be maintained, notably to make the bead as a whole easier to manufacture, without this leading to a significant hysteresis loss. This is because in the immediate environment of the bead wire and of the rim seat, both of which are extremely rigid, deformations suffered during running are very small. By contrast, in order for the tire to maintain good roadholding, particularly under heavy load, the overall reduction in the volume of the filler is advantageously compensated for by the presence of an additional stiffening reinforcement which itself gives rise only to small hysteresis losses.

The sidewall 30 therefore comprises a stiffening reinforcement 140 formed of a plurality of metallic reinforcing elements oriented at a zero or small angle, namely an angle less than or equal to 10 degrees with respect to the circumferential direction. This stiffening reinforcement 140 is positioned in such a way that the distance DAE between the radially innermost point 71 of the bead wire 70 and the radially outer end 142 of the stiffening reinforcement 140 is equal to 35% of the radial height H of the tire 10. The distance DAI between the radially innermost point 71 of the bead wire 70 and the radially inner end 141 of the stiffening reinforcement 140 is equal here to 4% of the radial height H of the tire 10.

There is a "decoupling ply" 150 axially between the stiffening reinforcement 140 and the main strand 62 of the carcass reinforcement 60. The decoupling ply has a radially inner end 151 and a radially outer end 152. As it experiences shear, this decoupling ply 150 allows the meridian tension to be transmitted from the carcass reinforcement 60 to the stiffening reinforcement 140. It therefore limits the transfer of stress between the stiffening reinforcement 140 and the carcass reinforcement 60 and at the same time regularizes the thickness in which these stresses are applied, something which contributes to a better distribution of these stresses.

Figure 6:
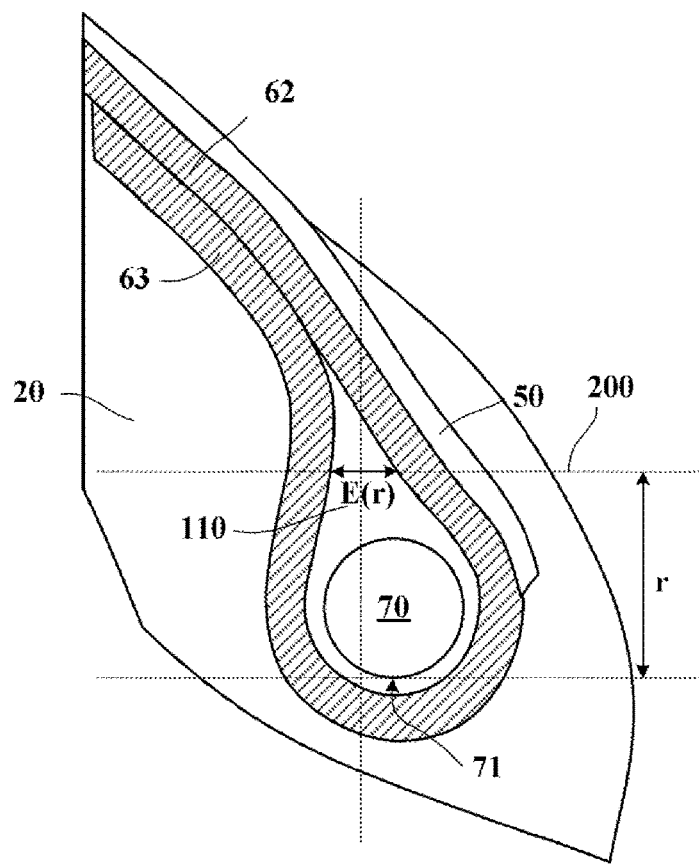
FIG. 6 illustrates how the axial thickness of the bead is determined.

The filler 110 has an axial thickness E(r) which is determined in the way illustrated in FIG. 6. The axial thickness E(r) corresponds to the length of the intersection of the filler with a straight line 200 parallel to the axis of rotation of the tire (which axis is indicated by reference 3 in FIG. 4) and having an intersection with the filler 110 at a radial distance r from the radially innermost point 71 of the bead wire 70.

Figure 10:
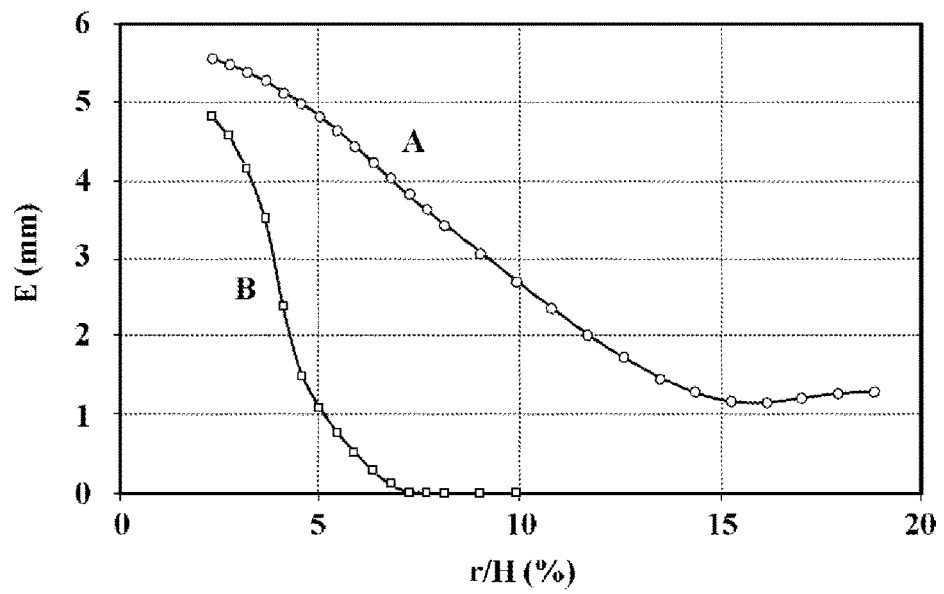
FIGS. 10 and 11 depict the trend of the thickness of the bead of the tire depicted in FIGS. 5 and 8, and how this thickness varies.
Figure 11:
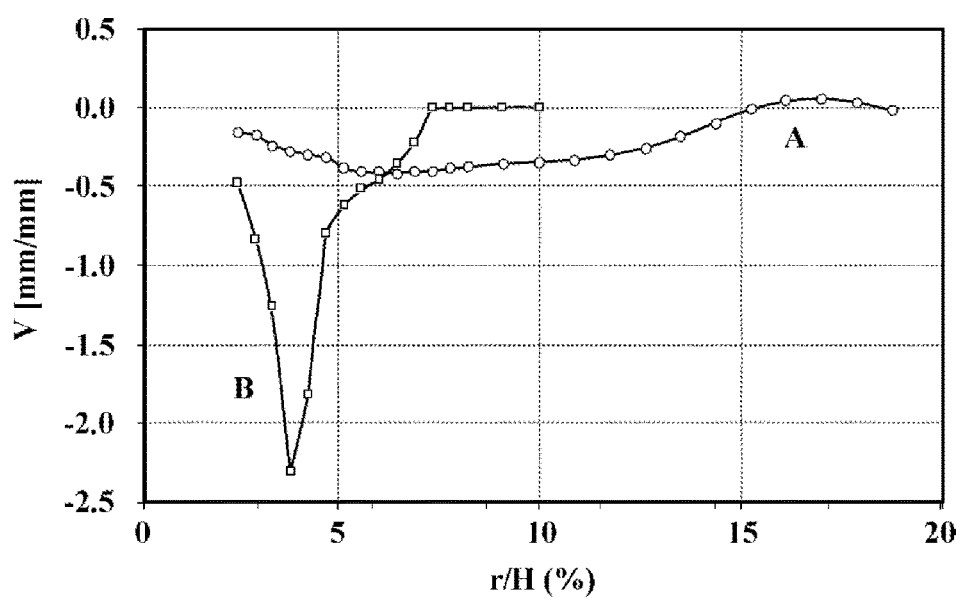

The trend of the axial thickness E(r) of the filler 110 of the tire depicted in FIG. 5 has been plotted in FIG. 10 (curve B) and compared with the trend of the axial thickness E(r) of the filler 110 of the reference tire depicted in FIG. 3. FIG. 11 compares the variation in thickness $$V = \frac{\partial E(r)}{\partial r}$$

for the two fillers. It can be seen that the filler depicted in FIG. 5 corresponds to a particular embodiment whereby the trend of the axial thickness E(r) is such that, in the range of distances r comprised between 0% and 10% of the radial height H of the tire, the variation in thickness $$\frac{\partial E(r)}{\partial r}$$

is less than or equal to −0.5 mm/mm over a little more than 3% of the radial height H of the tire. In this particular instance, the variation in axial thickness $$\frac{\partial E(r)}{\partial r}$$

is even less than or equal to −1 mm/mm over 1.5% of the radial height H of the tire.

The stiffening reinforcement 140 of the tire 10 depicted in FIG. 5 is made up of a plurality of discontinuous reinforcing elements, these reinforcing elements being positioned on a plurality of circles (C, C1, C2) concentric with the axis of rotation of the tire, each circle being defined by a mean radius R, R1, R2 measured with respect to the axis of rotation in the way illustrated in FIG. 10. This of course is a simplified diagram, confined to three turns, to explain the principle behind how the reinforcers are set out. The thickening reinforcement may naturally comprise more turns.

Figure 9:
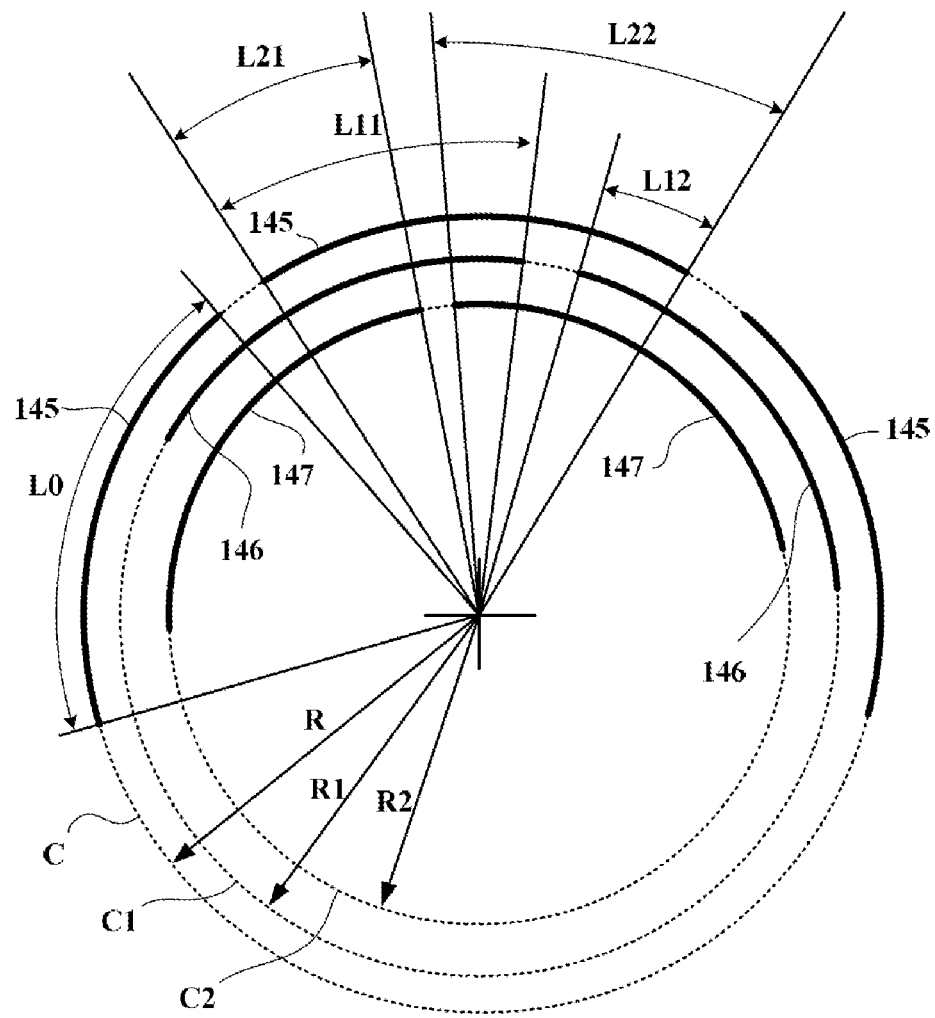
FIG. 9 shows the arrangement of the reinforcers of a ply of the stiffening reinforcement used in the beads of the tires of FIGS. 5 and 8.

FIG. 9 shows the arrangement of the reinforcing elements of the stiffening reinforcement 140 of the tire 10 in three adjacent circles C, C1 and C2, each circle being centered on the axis of rotation of the assembly formed by the tire and the mounting rim. All the reinforcing elements are metallic and have substantially the same length equal to L0, in this instance 125 mm. The spacing between adjacent circles C, C1 and C2 on which the discontinuous reinforcing elements are positioned is equal to the diameter of the reinforcing elements increased by at least 0.2 mm and preferably by at least 0.5 mm.

FIG. 10 partially depicts the reinforcement 140, the axis of rotation of the tire being perpendicular to the plane of the figure. It may be seen that a reinforcing element 145 of length L0 on the circle C of radius R is mechanically coupled along arc lengths L11 and L12 to two reinforcing elements 146 of the circle C1 of radius R1 (R1 being less than R) adjacent to the circle C. The same reinforcing element 145 is coupled along arc lengths L21 and L22 to two reinforcing elements 147. In this particular instance, the coupling lengths are: L11=87.9 mm (namely 70% of L0); L12=37.7 mm (namely 30% of L0); L21=50.2 mm (namely 40% of L0); L22=75.3 mm (namely 60% of L0). These coupling lengths satisfy the relationship 1.5≤K≤4 with K=(1−L12/L0)/(1−L11/L0). Specifically, the value adopted by K is 2.3 when considering the coupling values for coupling between a reinforcing element 145 of length L0 on the circle C and the reinforcing elements 146 of the circle C1 of radius R1 (R1 being less than R) adjacent to the circle C.

Figure 8:
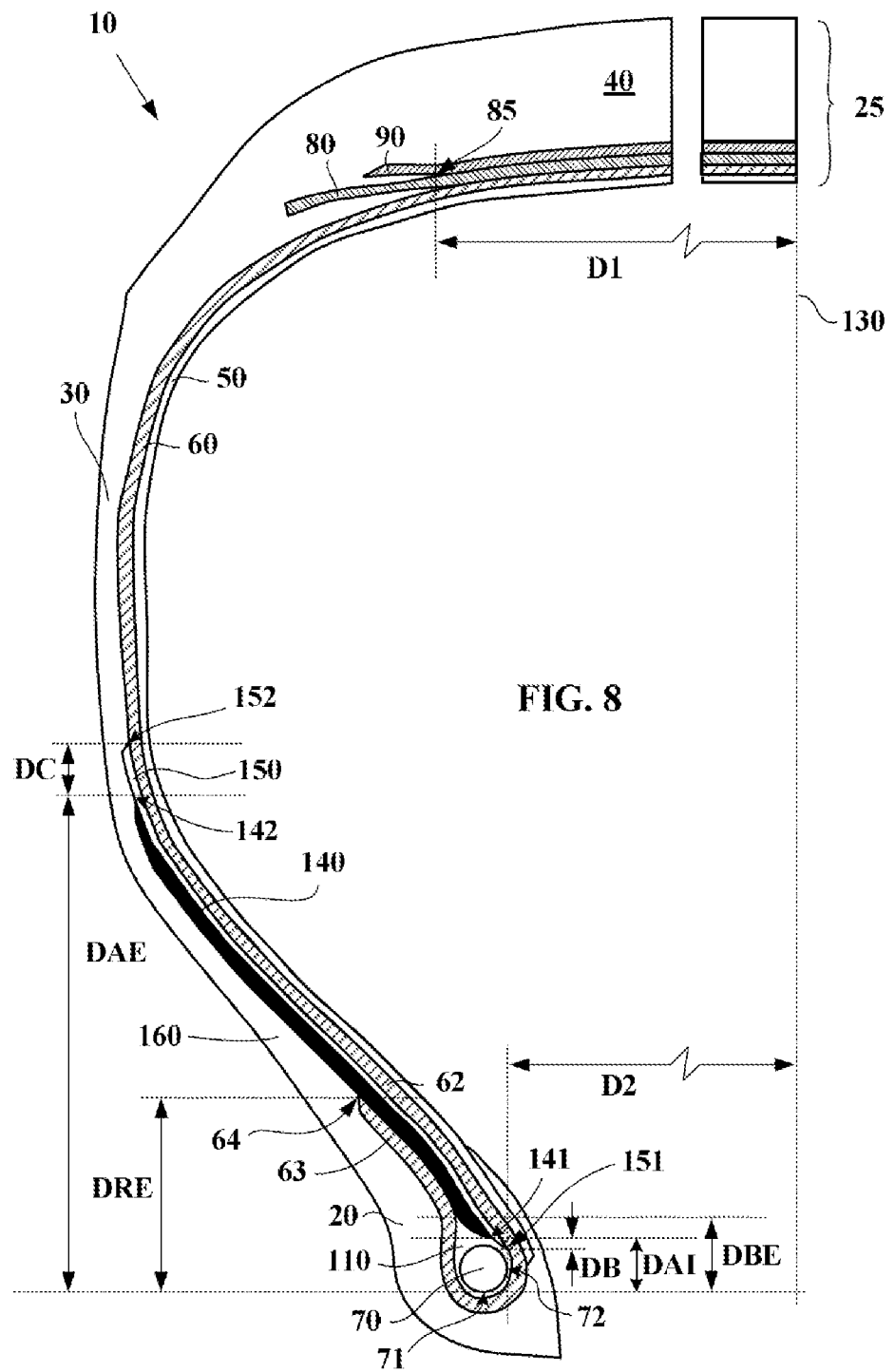
FIG. 8 depicts, in radial section, part of the tire of an assembly according to the invention.

FIG. 8 depicts in radial section part of the tire of an assembly according to the invention. This tire repeats the features of the tire of the prior art described hereinabove and improves on them in order to improve the endurance of the tire. For the sake of conciseness, only the distinctive aspects by which this tire differs from the tire according to the prior art depicted in FIG. 5 will be highlighted.

As in the tire depicted in FIG. 5, a portion 160 of rubber composition is positioned axially on the outside of the stiffening reinforcement. The thickness E2 of this portion of rubber composition, measured perpendicular to the stiffened reinforcement (in the way shown in FIG. 7) is greater than or equal to 1.2 mm at all points. In the tire of FIG. 5, this thickness E2 is equal to 1 mm.

Figure 7:
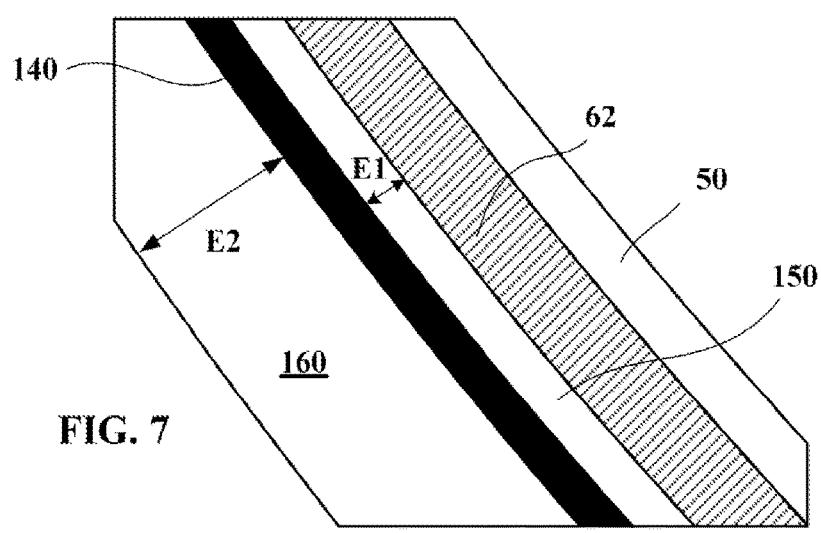
FIG. 7 illustrates how the thickness of certain components of the tire of an assembly according to the invention is measured.

Likewise, the decoupling ply 150 has a thickness E1 greater than or equal to 0.8 mm, this thickness being measured perpendicular to the stiffening reinforcement (see FIG. 7). In the tire of FIG. 5, this thickness E1 is equal to 0.6 mm.

The ratio D2/D1 is equal to 1.05, if D1 denotes the axial distance between each contact end 85 and the median plane 130 of the tire 10 and D2 is the axial distance between the axially innermost point 72 of the annular reinforcing structure 70 and the median plane 130 of the tire. The distances D1 and D2 are measured when the tire 10 is mounted on the mounting rim and inflated to its service pressure.

Moreover, the ratio D2'/D1 is equal to 0.96, if D2' denotes the axial distance between the axially innermost point of the annular reinforcing structure and the median plane of the tire, measured when the tire is in the free state, not mounted on a rim or inflated, and placed on the ground in such a way that its axis of rotation is parallel to the ground. In that respect the tire differs from the reference tire of FIG. 3 in which D2'/D1 is equal to 1.23.

The radially inner end 141 of the stiffening reinforcement 140 is radially on the outside of the radially inner end 151 of the decoupling ply 150: the radial distance DB between these two ends is equal to 2.2 mm.

The radially outer end 142 of the stiffening reinforcement 140 is radially on the inside of the radially outside end 152 of the decoupling ply, the radial distance DC between these two ends being equal to 5 mm whereas the distance DC is equal to 10 mm for the tire of FIG. 5.

An assembly according to the invention, corresponding to the tire depicted in FIG. 8, an assembly of the prior art (the tire depicted in FIG. 5, mounted on the same mounting rim) and a reference assembly, corresponding to the tire depicted in FIG. 3, mounted on the same mounting rim, were compared under running conditions (size studied: 205/55 R16). The assembly according to the invention achieved savings in terms of rolling resistance of 0.4 kg per tonne compared with the reference tire, for the same cornering stiffness, the same load and the same inflation pressure; its endurance is markedly improved by comparison with the tire depicted in FIG. 5. Table II shows this same result in relation to the rolling resistance of the reference assembly.

TABLE II

| Variant | FIG. | Rolling resistance (base 100) | Endurance distance covered (base 100) |
|---|---|---|---|
| Reference | 3 | 100 | 100 |
| Prior art | 5 | 95 | 74 |
| Invention | 8 | 95 | 100 |

It may be noted that the assembly according to the invention allows a very appreciable improvement in endurance by comparison with the assembly according to the prior art.

The applicant company explains these surprising differences in performance which were obtained in spite of relatively modest structural differences by the fact that the thicknesses of rubber composition surrounding the metallic reinforcing elements of the stiffening reinforcement have been increased. Even a relatively small (in this instance from 1 to 1.2 mm) increase allows the sidewall better to absorb shear, leading to a pronounced improvement in tire endurance.

The invention claimed is:

1. An assembly comprising a tire and a mounting rim, the tire having an axis of rotation and comprising:
   two beads adapted to come into contact with the mounting rim, each bead comprising at least one annular reinforcing structure, each annular reinforcing structure having an axially innermost point, the two annular reinforcing structures defining a median plane of the tire, perpendicular to the axis of rotation of the tire and situated equal distances from the annular reinforcing structures of each bead;
   two sidewalls extending the beads radially outwards, the two sidewalls meeting in a crown comprising a crown reinforcement comprising two plies each comprising reinforcing elements and being in contact with one another over at least part of the width of the crown, this part extending on each side of the median plane of the tire, between two contact ends, the crown reinforcement being surmounted by a tread;
   at least one carcass reinforcement extending from the beads through the sidewalls as far as the crown, the carcass reinforcement comprising a plurality of carcass reinforcing elements and being anchored in the two beads by a turn-up around the annular reinforcing structure so as to form, within each bead, a main strand and a turn-up, each turn-up extending radially outwards as far as an end situated a radial distance DRE from a radially innermost point of the annular reinforcing structure of the bead, the radial distance DRE being greater than or equal to 5% and less than or equal to 20% of a radial height H of the tire;
   wherein each bead comprises a filler formed of a rubber composition, the filler being situated, at least partially, radially on the outside of the annular reinforcing structure and at least partially between the main strand and the turn-up of the carcass reinforcement, the filler extending radially as far as a radial distance DBE from the radially innermost point of the annular reinforcing structure of the bead, the radial distance DBE being less than or equal to 10% of the radial height H of the tire,
   wherein at least one sidewall of the tire further comprises a stiffening reinforcement having a radially inner end and a radially outer end, the stiffening reinforcement being formed of a plurality of metallic reinforcing elements oriented at an angle less than or equal to 10 degrees with respect to the circumferential direction, this stiffening reinforcement being positioned in such a way that a distance DAE between a radially innermost point of the annular reinforcing structure and the radially outer end of the stiffening reinforcement is greater than or equal to 20% and less than or equal to 40% of the radial height H of the tire and that a distance DAI between the radially innermost point of the annular reinforcing structure and the radially inner end of the stiffening reinforcement is greater than or equal to 5% and less than or equal to 15% of the radial height H of the tire,
   wherein a portion of rubber composition is positioned axially on the outside of the stiffening reinforcement, wherein a thickness (E2) of this portion of rubber composition, measured perpendicular to the stiffening reinforcement, is greater than or equal to 1.2 mm at all points;
   wherein a ratio D2/D1 is greater than or equal to 1, where D1 denotes an axial distance between each contact end and the median plane of the tire and D2 is an axial distance between the axially innermost point of the annular reinforcing structure and the median plane of the tire, the distances D1 and D2 being measured when the tire is mounted on the mounting rim and inflated to a service pressure;
   wherein the tire further comprises an decoupling ply made of a rubber composition and positioned axially between the carcass reinforcement and the stiffening reinforcement, the decoupling ply having a radially inner end and a radially outer end, the decoupling ply having a thickness (E1) greater than or equal to 0.8 mm, this thickness being measured perpendicular to the stiffening reinforcement;
   wherein the radially inner end of the stiffening reinforcement is radially on the outside of a radially inner end of the decoupling ply, a radial distance (DB) between these two ends being less than 10 mm, and
   wherein the radially outer end of the stiffening reinforcement is radially on the inside of a radially outer end of the decoupling ply, a radial distance (DC) between these two ends being less than 10 mm.

2. The assembly according to claim 1, wherein the distance (DB) separating the radially inner end of the stiffening reinforcement and the radially inner end of the decoupling ply is less than or equal to 8 mm.

3. The assembly according to claim 1, wherein the distance (DC) separating the radially outer end of the stiffening reinforcement and the radially outer end of the decoupling ply is less than or equal to 8 mm.

4. The assembly according to claim 1, wherein a ratio D2'/D1 is greater than or equal to 0.9 and less than or equal to 0.97, where D2' denotes the axial distance between the axially innermost point of the annular reinforcing structure and the median plane of the tire, measured when the tire is in the free state, not mounted on a rim and not inflated, and placed on the ground in such a way that its axis of rotation is parallel to the ground.

5. The assembly according to claim 1, wherein the radial distance DRE is greater than or equal to 7% and less than or equal to 18% of the radial height H of the tire.

6. The assembly according to claim 1, wherein the distance DAE between the radially innermost point of the annular reinforcing structure and the radially outer end of the stiffening reinforcement is greater than or equal to 25% and less than or equal to 35% of the radial height H of the tire.

7. The assembly according to claim 1, wherein the filler has an axial thickness E(r), this thickness corresponding to the length of the intersection of the filler with a straight line parallel to the axis of rotation of the tire and having an intersection with the filler at a radial distance r from the radially innermost point of the annular reinforcing structure, the thickness E(r) having a trend such that, in the range of distances r comprised between 0% and 10% of the radial height H of the tire, the variation in thickness $$\frac{\partial E(r)}{\partial r}$$

is less than or equal to −0.5 mm/mm over at least 3% of the radial height H of the tire.

8. The assembly according to claim 1, wherein the filler has an axial thickness E(r), this axial thickness corresponding to the length of the intersection of the filler with a straight line parallel to the axis of rotation of the tire and having an intersection with the filler at a radial distance r from the radially innermost point of the annular reinforcing structure, the axial thickness E(r) having a trend such that, in the range of distances r comprised between 0% and 10% of the radial height H of the tire, the variation in axial thickness $$\frac{\partial E(r)}{\partial r}$$

is less than or equal to −1 mm/mm over at least 1.5% of the radial height H of the tire.

9. The assembly according to claim 1, wherein the stiffening reinforcement is made up of a plurality of discontinuous reinforcing elements, these reinforcing elements being positioned in a plurality of circles concentric with the axis of rotation of the tire.

10. The assembly according to claim 1, wherein the stiffening reinforcement is made up of a plurality of discontinuous reinforcing elements of length L0, these reinforcing elements being positioned in a plurality of circles concentric with the axis of rotation of the tire mounted on its rim, each circle being defined by a mean radius measured with respect to the axis of rotation, each discontinuous reinforcing element of length L0 situated on a circle C of radius R being mechanically coupled over coupling lengths L11 and L12 respectively to two discontinuous reinforcing elements situated on a circle C1 of radius R1 less than the radius R, the circle being immediately adjacent to the circle C, in which the coupling lengths L11 and L12, L11 being taken as being greater than or equal to L12, satisfy the following relationship: 1.5≤K≤4 with K=(1−L12/L0)(1−L11/L0).

11. The assembly according to claim 10, wherein:
(a) each discontinuous reinforcing element of length L0 situated on a circle C of radius R is mechanically coupled over coupling lengths L11 and L12 to two discontinuous reinforcing elements situated on a circle C1 of radius R1, which circle is immediately adjacent to the circle C, the coupling length L11 being greater than or equal to 55% of L0 and less than or equal to 75% of L0 and the coupling length L12 being greater than or equal to 10% of L0 and less than or equal to 30% of L0;
(b) each discontinuous reinforcing element of length L0 situated on a circle C of radius R is mechanically coupled over coupling lengths L21 and L22 to two discontinuous reinforcing elements situated on a circle C2 of radius R2, which circle is immediately adjacent to the circle C1, the coupling length L21 being greater than or equal to 20% of L0 and less than or equal to 40% of L0 and the coupling length L22 being greater than or equal to 45% of L0 and less than or equal to 65% of L0.

12. The assembly according to claim 11, wherein the mounting rim comprises a part forming a rim seat comprising, radially on the outside, a rim flange of substantially circular profile, and wherein the radially outer end of the stiffening reinforcement is situated on a straight line J2 passing through a center J of the profile of the rim flange and making an angle α (alpha) open axially towards the inside and radially towards the outside, the angle α (alpha) being greater than or equal to 90° and less than or equal to 120°.

13. The assembly according to claim 12, wherein the angle α (alpha) is greater than or equal to 100° and less than or equal to 115°.

* * * * *